(12) United States Patent
Arai

(10) Patent No.: US 11,362,334 B2
(45) Date of Patent: Jun. 14, 2022

(54) BINDER COMPOSITION FOR ELECTRICAL STORAGE DEVICE, SLURRY COMPOSITION FOR ELECTRICAL STORAGE DEVICE ELECTRODE, ELECTRODE FOR ELECTRICAL STORAGE DEVICE, AND ELECTRICAL STORAGE DEVICE

(71) Applicant: ZEON CORPORATION, Tokyo (JP)

(72) Inventor: Kenji Arai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 17/045,992

(22) PCT Filed: Apr. 19, 2019

(86) PCT No.: PCT/JP2019/016775
§ 371 (c)(1),
(2) Date: Oct. 8, 2020

(87) PCT Pub. No.: WO2019/208419
PCT Pub. Date: Oct. 31, 2019

(65) Prior Publication Data
US 2021/0305573 A1 Sep. 30, 2021

(30) Foreign Application Priority Data
Apr. 26, 2018 (JP) .............................. JP2018-085454

(51) Int. Cl.
*H01M 4/62* (2006.01)
*H01G 11/38* (2013.01)
*H01M 4/04* (2006.01)
*H01G 11/28* (2013.01)
(Continued)

(52) U.S. Cl.
CPC .............. *H01M 4/622* (2013.01); *C08F 2/24* (2013.01); *H01G 11/28* (2013.01); *H01G 11/38* (2013.01); *H01M 4/0404* (2013.01); *H01M 4/13* (2013.01); *H01M 4/131* (2013.01); *H01M 4/133* (2013.01); *H01M 4/134* (2013.01); *H01G 11/50* (2013.01); *Y02E 60/10* (2013.01)

(58) Field of Classification Search
None
See application file for complete search history.

(56) References Cited

U.S. PATENT DOCUMENTS 7,052,629 B2 * 5/2006 Maeda .................. H01M 4/621
252/511
2006/0058462 A1 3/2006 Kim et al.
(Continued)

FOREIGN PATENT DOCUMENTS

CN 103173161 A 6/2013
JP 2006513554 A 4/2006
(Continued)

OTHER PUBLICATIONS

Oct. 27, 2020, International Preliminary Report on Patentability issued in the International Patent Application No. PCT/JP2019/016775.
(Continued)

*Primary Examiner* — Katie L. Hammer
(74) *Attorney, Agent, or Firm* — Kenja IP Law PC

(57) ABSTRACT

Provided is a binder composition for an electrical storage device that can both ensure stability of a slurry composition and enhance peel strength of an electrode and rate characteristics of an electrical storage device. The binder composition contains a particulate polymer. The particulate polymer includes a cyano group-containing monomer unit in a proportion of not less than 5 mass % and not more than 45 mass % and includes an amide group-containing monomer unit in a proportion of not less than 0.3 mass % and not more than 10 mass %. Moreover, the particulate polymer has a core-shell structure including a core portion and a shell portion at least partially covering an outer surface of the core portion, and has at least one glass-transition temperature at 10° C. or lower.

8 Claims, 1 Drawing Sheet

(51) Int. Cl.
*C08F 2/24* (2006.01)
*H01M 4/13* (2010.01)
*H01M 4/133* (2010.01)
*H01M 4/134* (2010.01)
*H01M 4/131* (2010.01)
*H01G 11/50* (2013.01)

(56) References Cited

U.S. PATENT DOCUMENTS

| | | | |
|---|---|---|---|
| 2012/0177991 | A1 | 7/2012 | Mogi et al. |
| 2013/0330622 | A1 | 12/2013 | Sasaki |
| 2017/0054152 | A1 | 2/2017 | Yamamoto |
| 2018/0248191 | A1* | 8/2018 | Liu .................. C08F 220/06 |

FOREIGN PATENT DOCUMENTS

| | | | | |
|---|---|---|---|---|
| JP | 2012094506 | A | 5/2012 | |
| WO | 2011016563 | A1 | 2/2011 | |
| WO | 2012115096 | A1 | 8/2012 | |
| WO | 2015174036 | A1 | 11/2015 | |
| WO | WO-2017032320 | A1 * | 3/2017 | ............ H01M 4/621 |

OTHER PUBLICATIONS

Jul. 30, 2019, International Search Report issued in the International Patent Application No. PCT/JP2019/016775.

Dec. 22, 2021, the Extended European Search Report issued by the European Patent Office in the corresponding European Patent Application No. 19793373.2.

\* cited by examiner

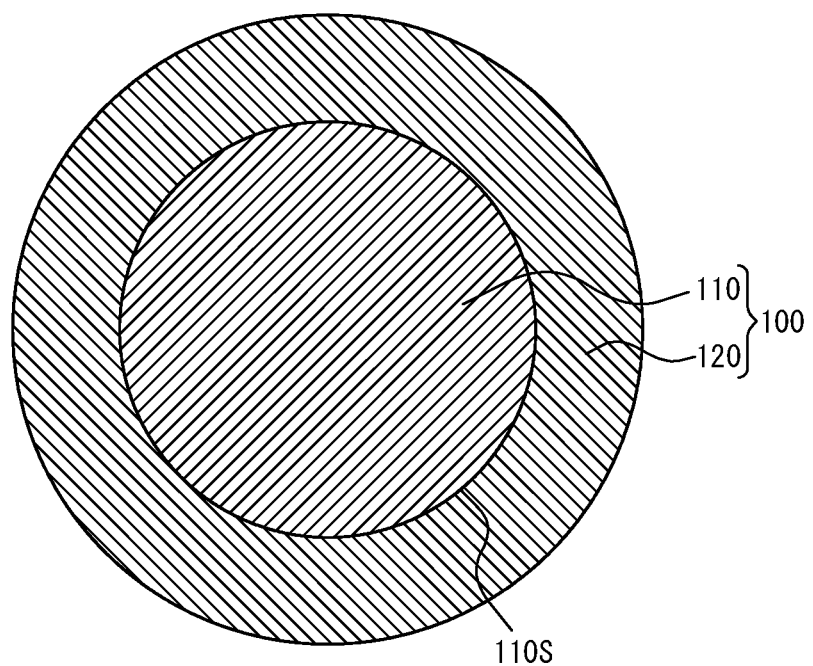

BINDER COMPOSITION FOR ELECTRICAL STORAGE DEVICE, SLURRY COMPOSITION FOR ELECTRICAL STORAGE DEVICE ELECTRODE, ELECTRODE FOR ELECTRICAL STORAGE DEVICE, AND ELECTRICAL STORAGE DEVICE

TECHNICAL FIELD

The present disclosure relates to a binder composition for an electrical storage device, a slurry composition for an electrical storage device electrode, an electrode for an electrical storage device, and an electrical storage device.

BACKGROUND

Electrical storage devices such as lithium ion secondary batteries and electric double-layer capacitors have characteristics such as compact size, light weight, high energy-density, and the ability to be repeatedly charged and discharged, and are used in a wide variety of applications. Consequently, in recent years, studies have been made to improve battery members such as electrodes for the purpose of achieving even higher electrical storage device performance.

An electrode for a lithium ion secondary battery, for example, generally includes a current collector and an electrode mixed material layer formed on the current collector. The electrode mixed material layer is formed, for example, by applying a slurry composition onto the current collector and then drying the slurry composition. The slurry composition contains a dispersion medium and, dispersed therein, an electrode active material, a binder composition containing a binder, and so forth.

In recent years, there have been attempts to improve binder compositions used in the formation of electrode mixed material layers in order to achieve further improvement of electrical storage device performance (for example, refer to Patent Literature (PTL) 1 to 3).

CITATION LIST

Patent Literature

PTL 1: WO2015/174036A1
PTL 2: WO2011/016563A1
PTL 3: JP2012-94506A

SUMMARY

Technical Problem

With regards to a binder composition that is used in production of an electrode of an electrical storage device, it is desirable that a slurry composition obtained using the binder composition does not excessively thicken even when subjected to high shear (i.e., slurry composition stability is desirable). It is also desirable that when an electrode is produced by forming an electrode mixed material layer from a slurry composition containing a binder composition, the binder composition increases close adherence between the electrode mixed material layer and a current collector (i.e., peel strength of the electrode) while also causing an electrical storage device in which the electrode is used to display excellent rate characteristics.

However, it has been difficult to enhance slurry composition stability, electrode peel strength, and electrical storage device rate characteristics in a good balance using conventional binder compositions such as mentioned above.

Accordingly, one object of the present disclosure is to provide a binder composition for an electrical storage device that can both ensure stability of a slurry composition and enhance peel strength of an electrode and rate characteristics of an electrical storage device.

Another object of the present disclosure is to provide a slurry composition for an electrical storage device electrode that has excellent stability and can enhance peel strength of an electrode and rate characteristics of an electrical storage device.

Another object of the present disclosure is to provide an electrode for an electrical storage device that has excellent peel strength and can cause an electrical storage device to display excellent rate characteristics.

Another object of the present disclosure is to provide an electrical storage device having excellent rate characteristics.

Solution to Problem

The inventor conducted diligent investigation with the aim of solving the problems set forth above. The inventor discovered that slurry composition stability, electrode peel strength, and electrical storage device rate characteristics can be enhanced in a good balance by using a binder composition containing a particulate polymer that has a specific core-shell structure, that includes a cyano group-containing monomer unit and an amide group-containing monomer unit in proportions within specific ranges, and that has at least one glass-transition temperature at not higher than a specific temperature. In this manner, the inventor completed the present disclosure.

Specifically, the present disclosure aims to advantageously solve the problems set forth above, and a presently disclosed binder composition for an electrical storage device comprises a particulate polymer, wherein the particulate polymer includes a cyano group-containing monomer unit in a proportion of not less than 5 mass % and not more than 45 mass % and includes an amide group-containing monomer unit in a proportion of not less than 0.3 mass % and not more than 10 mass %, and the particulate polymer has a core-shell structure including a core portion and a shell portion at least partially covering an outer surface of the core portion, and has at least one glass-transition temperature at 10° C. or lower. By using a binder composition containing the particulate polymer set forth above, it is possible to both ensure stability of a slurry composition and enhance peel strength of an electrode and rate characteristics of an electrical storage device.

The phrase "includes a monomer unit" as used in the present disclosure means that "a repeating unit derived from the monomer is included in a polymer obtained using the monomer".

Moreover, a "glass-transition temperature" referred to in the present disclosure can be measured by a method described in the EXAMPLES section of the present specification.

Furthermore, the proportional content of a monomer unit in a polymer such as a particulate polymer can be determined from the ratio of a monomer capable of forming that monomer unit in a monomer composition used in polymerization of the polymer, for example, or can be measured by a nuclear magnetic resonance (NMR) method such as $^1$H-NMR or by pyrolysis gas chromatography.

In the presently disclosed binder composition for an electrical storage device, the particulate polymer preferably has at least two glass-transition temperatures within a range of −80° C. to 80° C. When the particulate polymer has at least two glass-transition temperatures within the range set forth above, sufficient peel strength of an electrode can be ensured. Moreover, in a case in which an electrode produced in an elongated form is then wound up for storage or transport, for example, sticking together of adjacent electrodes via an electrode mixed material layer can be inhibited (i.e., blocking resistance of an electrode can be ensured). Furthermore, in a situation in which an electrode is subjected to a pressing process by roll pressing, staining of a roll used in the roll pressing can be inhibited.

In the presently disclosed binder composition for an electrical storage device, a glass-transition temperature of a polymer of the shell portion is preferably higher than a glass-transition temperature of a polymer of the core portion. When the glass-transition temperature of a polymer forming the shell portion (shell polymer) is higher than the glass-transition temperature of a polymer forming the core portion (core polymer), blocking resistance of an electrode can be ensured.

In the presently disclosed binder composition for an electrical storage device, the core portion preferably constitutes a proportion of not less than 30 mass % and not more than 70 mass % among a total of the core portion and the shell portion. When the proportion constituted by the core portion among the total of the core portion and the shell portion is within the range set forth above, it is possible to both further increase peel strength of an electrode and further improve rate characteristics of an electrical storage device.

In the presently disclosed binder composition for an electrical storage device, the particulate polymer preferably includes the cyano group-containing monomer unit in the core portion in a larger amount than in the shell portion. When the particulate polymer includes the cyano group-containing monomer unit in the core portion in a larger amount than in the shell portion, rate characteristics of an electrical storage device can be further improved.

Moreover, the present disclosure aims to advantageously solve the problems set forth above, and a presently disclosed slurry composition for an electrical storage device electrode comprises: an electrode active material; and any one of the binder compositions for an electrical storage device set forth above. A slurry composition that contains an electrode active material and any one of the binder compositions set forth above has excellent stability. Moreover, an electrode having excellent peel strength can be produced using this slurry composition, and an electrical storage device can be caused to display excellent rate characteristics by using the electrode.

Furthermore, the present disclosure aims to advantageously solve the problems set forth above, and a presently disclosed electrode for an electrical storage device comprises: an electrode mixed material layer formed using the slurry composition for an electrical storage device electrode set forth above; and a current collector. An electrode that includes an electrode mixed material layer formed using the slurry composition set forth above on a current collector has excellent peel strength and can cause an electrical storage device to display excellent rate characteristics.

Also, the present disclosure aims to advantageously solve the problems set forth above, and a presently disclosed electrical storage device comprises the electrode for an electrical storage device set forth above. An electrical storage device that includes the electrode set forth above has excellent rate characteristics.

Advantageous Effect

According to the present disclosure, it is possible to provide a binder composition for an electrical storage device that can both ensure stability of a slurry composition and enhance peel strength of an electrode and rate characteristics of an electrical storage device.

Moreover, according to the present disclosure, it is possible to provide a slurry composition for an electrical storage device electrode that has excellent stability and can enhance peel strength of an electrode and rate characteristics of an electrical storage device.

Furthermore, according to the present disclosure, it is possible to provide an electrode for an electrical storage device that has excellent peel strength and can cause an electrical storage device to display excellent rate characteristics.

Also, according to the present disclosure, it is possible to provide an electrical storage device having excellent rate characteristics.

BRIEF DESCRIPTION OF THE DRAWING

In the accompanying drawing,

FIG. 1 is a cross-sectional view schematically illustrating the structure of one example of a particulate polymer contained in a presently disclosed binder composition for an electrical storage device.

DETAILED DESCRIPTION

The following provides a detailed description of embodiments of the present disclosure.

The presently disclosed binder composition for an electrical storage device can be used in production of a slurry composition for an electrical storage device electrode. Moreover, a slurry composition for an electrical storage device electrode that is produced using the presently disclosed binder composition for an electrical storage device can be used in formation of an electrode of an electrical storage device. Furthermore, a feature of the presently disclosed electrical storage device is that it includes the presently disclosed electrode for an electrical storage device.

(Binder Composition for Electrical Storage Device)

The presently disclosed binder composition contains a particulate polymer as a binder and may optionally contain other components. The presently disclosed binder composition typically further contains a dispersion medium such as water. Features of the particulate polymer contained in the presently disclosed binder composition are that the particulate polymer has a core-shell structure, includes a cyano group-containing monomer unit and an amide group-containing monomer unit in proportions within specific ranges, and has at least one glass-transition temperature at not higher than a specific temperature.

<Particulate Polymer>

In an electrode for an electrical storage device that is produced by forming an electrode mixed material layer on a current collector using a slurry composition for an electrical storage device electrode containing the presently disclosed binder composition and an electrode active material, the particulate polymer is a component that can hold components contained in the electrode mixed material layer so that these components do not become detached from the electrode mixed material layer.

<<Core-Shell Structure>>

The particulate polymer has a core-shell structure including a core portion and a shell portion covering an outer surface of the core portion. Although the shell portion may partially cover the outer surface of the core portion, it is preferable that the shell portion completely covers the core portion from a viewpoint of further improving rate characteristics of an electrical storage device.

FIG. 1 illustrates cross-sectional structure of one example of a preferable particulate polymer. In FIG. 1, a particulate polymer 100 has a core-shell structure including a core portion 110 and a shell portion 120. The core portion 110 is a portion that is further inward than the shell portion 120 in the particulate polymer 100. The shell portion 120 is a portion that covers an outer surface 110S of the core portion 110 and is normally an outermost portion in the particulate polymer 100. Moreover, the shell portion 120 completely covers the outer surface 110S of the core portion 110.

Note that the particulate polymer may include any constituent element other than the core portion and the shell portion described above so long as the expected effects are not significantly lost. Specifically, the particulate polymer may, for example, include a portion inside of the core portion that is formed of a different polymer to the core portion. In one specific example, a seed particle may remain inside the core portion in a case in which the particulate polymer is produced by seeded polymerization. Note that seeded polymerization is advantageous in terms of enabling simple adjustment of the number-average particle diameter of the particulate polymer.

The proportion constituted by the core portion among the total of the core portion and the shell portion in the particulate polymer having a core-shell structure is preferably 30 mass % or more, and more preferably 40 mass % or more, and is preferably 70 mass % or less, and more preferably 60 mass % or less when the total mass of the core portion and the shell portion is taken to be 100 mass %. When the proportion constituted by the core portion among the total of the core portion and the shell portion is 30 mass % or more, it is possible to both further increase peel strength of an electrode and further improve rate characteristics of an electrical storage device. On the other hand, when the proportion constituted by the core portion among the total of the core portion and the shell portion is 70 mass % or less, rate characteristics of an electrical storage device can be further improved.

<<Chemical Composition>>

The particulate polymer having the core-shell structure described above includes a cyano group-containing monomer unit in a proportion of not less than 5 mass % and not more than 45 mass % and includes an amide group-containing monomer unit in a proportion of not less than 0.3 mass % and not more than 10 mass %. In addition, the particulate polymer includes monomer units other than a cyano group-containing monomer unit and an amide group-containing monomer unit (i.e., other monomer units) in a proportion of not less than 45 mass % and not more than 94.7 mass %.

[Cyano Group-Containing Monomer Unit]

Examples of cyano group-containing monomers that can form a cyano group-containing monomer unit include ethylenically unsaturated monomers that include a cyano group. Specific examples of cyano group-containing monomers that can be used include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these cyano group-containing monomers, acrylonitrile is preferable. Note that one cyano group-containing monomer may be used individually, or two or more cyano group-containing monomers may be used in combination in a freely selected ratio.

The proportion in which the particulate polymer includes a cyano group-containing monomer unit when all monomer units included in the particulate polymer are taken to be 100 mass % is required to be not less than 5 mass % and not more than 45 mass % as previously described, is preferably 10 mass % or more, more preferably 13 mass % or more, even more preferably 15 mass % or more, and particularly preferably 16 mass % or more, and is preferably 40 mass % or less, more preferably 30 mass % or less, and even more preferably 27 mass % or less. When the proportional content of a cyano group-containing monomer unit in the particulate polymer is less than 5 mass %, rate characteristics of an electrical storage device deteriorate. On the other hand, when the proportion constituted by a cyano group-containing monomer unit in the particulate polymer is more than 45 mass %, peel strength of an electrode decreases.

The amount of a cyano group-containing monomer unit included in the core polymer and the amount of a cyano group-containing monomer unit included in the shell polymer are not specifically limited so long as the proportion in which the overall particulate polymer includes a cyano group-containing monomer unit is not less than 5 mass % and not more than 45 mass % as previously described. However, the particulate polymer preferably includes a cyano group-containing monomer unit in the core portion in a larger amount than in the shell portion from a viewpoint of causing swelling of the core portion in electrolyte solution so as to increase diffusivity of charge carriers such as lithium ions and further improve rate characteristics of an electrical storage device.

The proportion in which the core polymer includes a cyano group-containing monomer unit when all monomer units included in the particulate polymer are taken to be 100 mass % is preferably 5 mass % or more, more preferably 7 mass % or more, even more preferably 9 mass % or more, and particularly preferably 10 mass % or more, and is 45 mass % or less, preferably 40 mass % or less, more preferably 30 mass % or less, even more preferably 25 mass % or less, and particularly preferably 20 mass % or less.

Moreover, the proportion in which the shell polymer includes a cyano group-containing monomer unit when all monomer units included in the particulate polymer are taken to be 100 mass % is preferably 1 mass % or more, more preferably 3 mass % or more, and even more preferably 5 mass % or more, and is preferably 10 mass % or less, more preferably less than 9 mass %, and even more preferably less than 8 mass %.

[Amide Group-Containing Monomer Unit]

Examples of amide group-containing monomers that can form an amide group-containing monomer unit include ethylenically unsaturated monomers that include an amide group. Specific examples of amide group-containing monomers that can be used include N-vinylacetamide, (meth)acrylamide, N-methylol(meth)acrylamide, dimethyl(meth)acrylamide, di ethyl(meth)acrylamide, hydroxyethyl (meth)acryl amide, N-methoxymethyl(meth)acrylamide, and dimethylaminopropyl(meth)acrylamide. Of these amide group-containing monomers, acrylamide is preferable. Note that one amide group-containing monomer may be used individually, or two or more amide group-containing monomers may be used in combination in a freely selected ratio.

Moreover, in the present disclosure, "(meth)acryl" is used to indicate "acryl" and/or "methacryl".

The proportion in which the particulate polymer includes an amide group-containing monomer unit when all monomer units included in the particulate polymer are taken to be 100 mass % is required to be not less than 0.3 mass % and not more than 10 mass % as previously described, is preferably 0.4 mass % or more, more preferably 0.8 mass % or more, and even more preferably 1 mass % or more, and is preferably 5 mass % or less, more preferably 3 mass % or less, and even more preferably 2 mass % or less. When the proportional content of an amide group-containing monomer unit in the particulate polymer is less than 0.3 mass %, stability of a slurry composition decreases. On the other hand, when the proportional content of an amide group-containing monomer unit in the particulate polymer is more than 10 mass %, stability of a slurry composition is lost, and peel strength of an electrode decreases. Moreover, polymerization stability of the particulate polymer cannot be ensured.

The proportion in which the core polymer includes an amide group-containing monomer unit and the proportion in which the shell polymer includes an amide group-containing monomer unit are not specifically limited so long as the proportion in which the overall particulate polymer includes an amide group-containing monomer unit is not less than 0.3 mass % and not more than 10 mass % as previously described. However, the particulate polymer preferably includes an amide group-containing monomer unit in the shell portion in a larger amount than in the core portion from a viewpoint of further improving stability of a slurry composition.

The proportion in which the core polymer includes an amide group-containing monomer unit when all monomer units included in the particulate polymer are taken to be 100 mass % is preferably less than 1 mass %, and more preferably 0 mass %.

Moreover, the proportion in which the shell polymer includes an amide group-containing monomer unit when all monomer units included in the particulate polymer are taken to be 100 mass % is preferably 0.4 mass % or more, more preferably 0.8 mass % or more, and even more preferably 1 mass % or more, and is 10 mass % or less, preferably 5 mass % or less, and more preferably 3 mass % or less.

[Other Monomer Units]

Examples of other monomer units that can be included in the particulate polymer include, without any specific limitations, any monomer unit derived from a monomer that includes neither a cyano group nor an amide group and that is copolymerizable with a cyano group-containing monomer and an amide group-containing monomer such as described above. For example, an aromatic vinyl monomer unit, an aliphatic conjugated diene monomer unit, a (meth)acrylic acid ester monomer unit, an acidic group-containing monomer unit, or a hydroxy group-containing monomer unit may be included as another monomer unit. Note that one other monomer that can form another monomer unit may be used individually, or two or more other monomers that can form other monomer units may be used in combination in a freely selected ratio.

The proportion in which the particulate polymer includes other monomer units when all monomer units included in the particulate polymer are taken to be 100 mass % is required to be not less than 45 mass % and not more than 94.7 mass % as previously described, is preferably 55 mass % or more, and more preferably 67 mass % or more, and is preferably 89.6 mass % or less, and more preferably 84.2 mass % or less.

—Aromatic Vinyl Monomer Unit—

Examples of aromatic vinyl monomers that can form an aromatic vinyl monomer unit include styrene, α-methylstyrene, vinyltoluene, and divinylbenzene. One of these aromatic vinyl monomers may be used individually, or two or more of these aromatic vinyl monomers may be used in combination. Of these aromatic vinyl monomers, styrene is preferable.

The proportion in which the particulate polymer includes an aromatic vinyl monomer unit when all monomer units included in the particulate polymer are taken to be 100 mass % is preferably 5 mass % or more, and more preferably 10 mass % or more, and is preferably 37 mass % or less, and more preferably 28 mass % or less. When the proportional content of an aromatic vinyl monomer unit in the particulate polymer is within any of the ranges set forth above, peel strength of an electrode can be further improved without an excessive rise of a glass-transition temperature of the particulate polymer.

The proportion in which the core polymer includes an aromatic vinyl monomer unit when all monomer units included in the particulate polymer are taken to be 100 mass % is preferably less than 6 mass %, and more preferably less than 4 mass %.

Moreover, the proportion in which the shell polymer includes an aromatic vinyl monomer unit when all monomer units included in the particulate polymer are taken to be 100 mass % is preferably 1 mass % or more, more preferably 5 mass % or more, and even more preferably 10 mass % or more, and is preferably 33 mass % or less, more preferably 28 mass % or less, and even more preferably 25 mass % or less.

—Aliphatic Conjugated Diene Monomer Unit—

Examples of aliphatic conjugated diene monomers that can form an aliphatic conjugated diene monomer unit include, but are not specifically limited to, 1,3-butadiene, 2-methyl-1,3-butadiene (isoprene), and 2,3-dimethyl-1,3-butadiene. One of these aliphatic conjugated diene monomers may be used individually, or two or more of these aliphatic conjugated diene monomers may be used in combination. Of these aliphatic conjugated diene monomers, 1,3-butadiene is preferable.

The proportion in which the particulate polymer includes an aliphatic conjugated diene monomer unit when all monomer units included in the particulate polymer are taken to be 100 mass % is preferably 20 mass % or more, more preferably 30 mass % or more, and even more preferably 40 mass % or more, and is preferably 70 mass % or less, more preferably 60 mass % or less, and even more preferably 50 mass % or less.

The proportion in which the core polymer includes an aliphatic conjugated diene monomer unit when all monomer units included in the particulate polymer are taken to be 100 mass % is preferably 10 mass % or more, more preferably 20 mass % or more, and even more preferably 25 mass % or more, and is preferably 60 mass % or less, more preferably 50 mass % or less, and even more preferably 40 mass % or less.

Moreover, the proportion in which the shell polymer includes an aliphatic conjugated diene monomer unit when all monomer units included in the particulate polymer are taken to be 100 mass % is preferably 1 mass % or more, more preferably 5 mass % or more, and even more preferably 8 mass % or more, and is preferably 25 mass % or less, more preferably 20 mass % or less, and even more preferably 15 mass % or less.

—(Meth)Acrylic Acid Ester Monomer Unit—

Examples of (meth)acrylic acid ester monomers that can form a (meth)acrylic acid ester monomer unit include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. One of these (meth) acrylic acid ester monomers may be used individually, or two or more of these (meth)acrylic acid ester monomers may be used in combination. Of these (meth)acrylic acid ester monomers, methyl methacrylate is preferable.

The proportion in which the particulate polymer includes a (meth)acrylic acid ester monomer unit when all monomer units included in the particulate polymer are taken to be 100 mass % is preferably 5 mass % or more, and more preferably 7 mass % or more, and is preferably 20 mass % or less, and more preferably 15 mass % or less.

The proportion in which the core polymer includes a (meth)acrylic acid ester monomer unit when all monomer units included in the particulate polymer are taken to be 100 mass % is preferably 1 mass % or less, and more preferably 0 mass %.

Moreover, the proportion in which the shell polymer includes a (meth)acrylic acid ester monomer unit when all monomer units included in the particulate polymer are taken to be 100 mass % is preferably 1 mass % or more, more preferably 5 mass % or more, and even more preferably 7 mass % or more, and is preferably 25 mass % or less, more preferably 20 mass % or less, and even more preferably 15 mass % or less.

—Acidic Group-Containing Monomer Unit—

Examples of acidic group-containing monomers that can form an acidic group-containing monomer unit include carboxy group-containing monomers, sulfo group-containing monomers, and phosphate group-containing monomers.

Examples of carboxy group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

Note that in the present disclosure, "(meth)allyl" is used to indicate "allyl" and/or "methallyl", whereas "(meth) acryloyl" is used to indicate "acryloyl" and/or "methacryloyl".

One acidic group-containing monomer may be used individually, or two or more acidic group-containing monomers may be used in combination. Of these acidic group-containing monomers, carboxy group-containing monomers are preferable, and acrylic acid and itaconic acid are more preferable.

The proportion in which the particulate polymer includes an acidic group-containing monomer unit when all monomer units included in the particulate polymer are taken to be 100 mass % is preferably 0.5 mass % or more, and more preferably 1 mass % or more, and is preferably 8 mass % or less, and more preferably 5 mass % or less.

The proportion in which the core polymer includes an acidic group-containing monomer unit when all monomer units included in the particulate polymer are taken to be 100 mass % is preferably 1 mass % or less, and more preferably 0.2 mass % or less.

Moreover, the proportion in which the shell polymer includes an acidic group-containing monomer unit when all monomer units included in the particulate polymer are taken to be 100 mass % is preferably 0.5 mass % or more, and more preferably 1 mass % or more, and is preferably 8 mass % or less, and more preferably 5 mass % or less.

—Hydroxy Group-Containing Monomer Unit—

Examples of hydroxy group-containing monomers that can form a hydroxy group-containing monomer unit include 2-hydroxyethyl acrylate, 2-hydroxypropyl acrylate, 2-hydroxyethyl methacrylate, and 2-hydroxypropyl methacrylate. One of these hydroxy group-containing monomers may be used individually, or two or more of these hydroxy group-containing monomers may be used in combination.

The proportion in which the particulate polymer includes a hydroxy group-containing monomer unit when all monomer units included in the particulate polymer are taken to be 100 mass % is 0 mass % or more, preferably 0.5 mass % or more, and more preferably 1 mass % or more, and is preferably 8 mass % or less, and more preferably 5 mass % or less.

The proportion in which the core polymer includes a hydroxy group-containing monomer unit when all monomer units included in the particulate polymer are taken to be 100 mass % is preferably 1 mass % or less, and more preferably 0 mass %.

Moreover, the proportion in which the shell polymer includes a hydroxy group-containing monomer unit when all monomer units included in the particulate polymer are taken to be 100 mass % is 0 mass % or more, preferably 0.5 mass % or more, and more preferably 1 mass % or more, and is preferably 8 mass % or less, and more preferably 5 mass % or less.

The core polymer preferably includes both a cyano group-containing monomer unit and an aliphatic conjugated diene monomer unit.

The total proportion in which the core polymer includes a cyano group-containing monomer unit and an aliphatic conjugated diene monomer unit when all monomer units included in the core polymer are taken to be 100 mass % is preferably 50 mass % or more (i.e., a cyano group-containing monomer unit and an aliphatic conjugated diene monomer unit preferably constitute a main component of the core portion), more preferably 70 mass % or more, and even more preferably 90 mass % or more.

A mass ratio of a cyano group-containing monomer unit included in the core polymer relative to an aliphatic conjugated diene monomer unit included in the core polymer (i.e., mass proportion of aliphatic conjugated diene monomer unit in core polymer/mass proportion of cyano group-containing monomer unit in core polymer) is preferably 1.0 times or more, more preferably 1.3 times or more, and even more preferably 1.8 times or more, and is preferably 10 times or less, more preferably 6.0 times or less, and even more preferably 3.0 times or less.

The shell polymer preferably includes both an aromatic vinyl monomer unit and an aliphatic conjugated diene monomer unit.

The total proportion in which the shell polymer includes an aromatic vinyl monomer unit and an aliphatic conjugated diene monomer unit when all monomer units included in the shell polymer are taken to be 100 mass % is preferably 50 mass % or more (i.e., an aromatic vinyl monomer unit and an aliphatic conjugated diene monomer unit preferably constitute a main component of the shell portion).

Moreover, the proportion in which the shell polymer includes an aromatic vinyl monomer unit when all monomer units included in the shell polymer are taken to be 100 mass % is preferably more than 50 mass % (i.e., the mass proportion of an aromatic vinyl monomer unit is preferably larger than the total mass proportion exclusive of the aromatic vinyl monomer unit).

Note that the proportional content of monomer units in the polymers forming the core portion and the shell portion can be controlled through the mixing ratio and polymerization conversion rate of monomers used in polymerization and can be confirmed through compositional analysis of a polymer at each step by pyrolysis gas chromatography.

<<Properties>>
[Glass-Transition Temperature]

The particulate polymer is required to have at least one glass-transition temperature at 10° C. or lower. In a case in which the particulate polymer does not have a glass-transition temperature at 10° C. or lower, peel strength of an electrode cannot be ensured.

Moreover, the particulate polymer preferably has at least two glass-transition temperatures within a range of −80° C. to 80° C., and more preferably has at least two glass-transition temperatures within a range of −60° C. to 60° C. When the particulate polymer has at least two glass-transition temperatures within a range of −80° C. to 80° C., sufficient peel strength of an electrode can be ensured while, on the other hand, also ensuring blocking resistance of the electrode. Moreover, in a situation in which the electrode is subjected to a pressing process by roll pressing, staining of a roll used in the roll pressing can be inhibited.

The particulate polymer preferably has at least two glass-transition temperatures, and more preferably has two glass-transition temperatures. For example, the core polymer and the shell polymer of the particulate polymer preferably each have one glass-transition temperature.

The glass-transition temperature of the shell polymer is preferably higher than the glass-transition temperature of the core polymer from a viewpoint of ensuring blocking resistance of an electrode.

The glass-transition temperature of the core polymer is preferably −50° C. or higher, more preferably −40° C. or higher, and even more preferably −37° C. or higher, and is preferably 10° C. or lower, more preferably 0° C. or lower, even more preferably −10° C. or lower, and particularly preferably −28° C. or lower.

Moreover, the glass-transition temperature of the shell polymer is preferably higher than 10° C., more preferably 20° C. or higher, and even more preferably 26° C. or higher, and is preferably 60° C. or lower, more preferably 50° C. or lower, and even more preferably 48° C. or lower.

[Number-Average Particle Diameter]

The number-average particle diameter of the particulate polymer is preferably 10 nm or more, more preferably 50 nm or more, and even more preferably 80 nm or more, and is preferably 300 nm or less, more preferably 150 nm or less, and even more preferably 100 nm or less.

Note that the "number-average particle diameter" of a particulate polymer referred to in the present disclosure can be measured by a method described in the EXAMPLES section of the present specification.

<<Production Method of Particulate Polymer Having Core-Shell Structure>>

The particulate polymer having the core-shell structure described above can be produced, for example, by stepwise polymerization in which the ratio of monomers for the core polymer and monomers for the shell polymer is changed over time. Specifically, the particulate polymer can be produced by continuous, multi-step emulsion polymerization or multi-step suspension polymerization in which a polymer formed in a preceding step is then covered by a polymer formed in a succeeding step.

The following describes one example of a case in which the particulate polymer having the core-shell structure described above is obtained by multi-step emulsion polymerization.

In the polymerization, an anionic surfactant such as sodium dodecylbenzenesulfonate or sodium dodecyl sulfate, a non-ionic surfactant such as polyoxyethylene nonylphenyl ether or sorbitan monolaurate, or a cationic surfactant such as octadecylamine acetate may be used as an emulsifier in accordance with a standard method. Moreover, a peroxide such as t-butyl peroxy-2-ethylhexanoate, potassium persulfate, ammonium persulfate, or cumene peroxide, or an azo compound such as 2,2'-azobis(2-methyl-N-(2-hydroxyethyl)-propionamide) or 2,2'-azobis(2-amidinopropane) hydrochloride may be used as a polymerization initiator.

The polymerization procedure involves initially mixing monomers for forming the core portion and the emulsifier, and then performing emulsion polymerization as one batch to obtain a particulate polymer that forms the core portion. A particulate polymer that has the core-shell structure described above can then be obtained by performing polymerization of monomers for forming the shell portion in the presence of the particulate polymer forming the core portion.

In this polymerization, it is preferable that the monomers for forming the shell polymer are supplied into the polymerization system continuously or divided into a plurality of portions from a viewpoint of covering the outer surface of the core portion well with the shell portion. Supplying the monomers for forming the shell polymer into the polymerization system continuously or divided into a plurality of portions enables good formation of a shell portion that covers the core portion.

<Solvent>

Any known solvent in which the previously described particulate polymer can be dissolved or dispersed can be adopted as the solvent used to produce the presently disclosed binder composition. Of such solvents, water is preferably used as the solvent of the binder composition. Note that at least a portion of the solvent of the binder composition may, without any specific limitations, be a polymerization solvent that was used in production of the particulate polymer.

<Other Components>

Besides the components described above, the presently disclosed binder composition may contain components such as binders other than the previously described particulate polymer (other binders), reinforcing materials, leveling agents, viscosity modifiers (polycarboxylic acids, polycarboxylic acid salts, etc.), and additives for electrolyte solution. These other components are not specifically limited so long as they do not affect battery reactions and may be selected from commonly known components such as those described in WO2012/115096A1. One of these components may be used individually, or two or more of these components may be used in combination in a freely selected ratio.

<Production Method of Binder Composition>

The presently disclosed binder composition can be produced by, for example, mixing the particulate polymer and other optionally used components in a solvent by a known method. Specifically, the binder composition can be produced by mixing the components using a mixer such as an impeller.

Note that in a case in which the particulate polymer and/or another optionally used binder is produced through polymerization in an aqueous solvent, a binder composition containing water as a solvent can be produced by mixing the particulate polymer and/or other binder while still in the form of an aqueous solution or water dispersion.

Moreover, production of the binder composition and production of the subsequently described slurry composition may be implemented at the same time by, for example, mixing the particulate polymer and an electrode active material, and subsequently adding another optionally used binder.

(Slurry Composition for Electrical Storage Device Electrode)

The presently disclosed slurry composition is a composition in which an electrode active material and the binder composition set forth above are dispersed in the presence of a dispersion medium. In other words, the presently disclosed slurry composition normally contains an electrode active material, the previously described particulate polymer, and a dispersion medium. The presently disclosed slurry composition may further contain other components besides the electrode active material, the particulate polymer, and the dispersion medium. A slurry composition that is produced using the binder composition set forth above has excellent stability. Moreover, an electrode having excellent peel strength can be produced using this slurry composition, and an electrical storage device can be caused to display excellent rate characteristics by using the electrode.

<Electrode Active Material>

The electrode active material is a material that gives and receives electrons in an electrode of an electrical storage device. In a case in which the electrical storage device is a lithium ion secondary battery, for example, the electrode active material is normally a material that can occlude and release lithium.

Although the following describes, as one example, a case in which the slurry composition for an electrical storage device electrode is a slurry composition for a lithium ion secondary battery electrode, the presently disclosed slurry composition for an electrical storage device electrode is not limited to the following example.

Examples of positive electrode active materials for a lithium ion secondary battery include, but are not specifically limited to, known positive electrode active materials such as lithium-containing cobalt oxide ($LiCoO_2$), lithium manganate ($LiMn_2O_4$), lithium-containing nickel oxide ($LiNiO_2$), a lithium-containing complex oxide of Co—Ni—Mn ($Li(CoMnNi)O_2$), a lithium-containing complex oxide of Ni—Mn—Al, a lithium-containing complex oxide of Ni—Co—Al, olivine-type lithium iron phosphate ($LiFePO_4$), olivine-type lithium manganese phosphate ($LiMnPO_4$), a $Li_2MnO_3$—$LiNiO_2$-based solid solution, lithium-rich spinel compounds represented by $Li_{1+x}Mn_{2-x}O_4$ (0<x<2), $Li[Ni_{0.17}Li_{0.2}Co_{0.07}Mn_{0.56}]O_2$, and $LiNi_{0.5}Mn_{1.5}O_4$.

The amount and particle diameter of the positive electrode active material are not specifically limited and may be the same as those of conventionally-used positive electrode active materials.

Examples of negative electrode active materials for a lithium ion secondary battery include carbon-based negative electrode active materials, metal-based negative electrode active materials, and negative electrode active materials that are a combination thereof.

A carbon-based negative electrode active material can be defined as an active material that contains carbon as its main framework and into which lithium can be inserted (also referred to as "doping"). Examples of carbon-based negative electrode active materials include carbonaceous materials and graphitic materials.

Examples of carbonaceous materials include graphitizing carbon and non-graphitizing carbon, typified by glassy carbon, which has a structure similar to an amorphous structure.

The graphitizing carbon may be a carbon material made using tar pitch obtained from petroleum or coal as a raw material. Specific examples of graphitizing carbon include coke, mesocarbon microbeads (MCMB), mesophase pitch-based carbon fiber, and pyrolytic vapor-grown carbon fiber.

Examples of the non-graphitizing carbon include pyrolyzed phenolic resin, polyacrylonitrile-based carbon fiber, quasi-isotropic carbon, pyrolyzed furfuryl alcohol resin (PFA), and hard carbon.

Examples of graphitic materials include natural graphite and artificial graphite.

Examples of artificial graphite include artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

A metal-based negative electrode active material is an active material that contains metal, the structure of which usually contains an element that allows insertion of lithium, and that has a theoretical electric capacity per unit mass of 500 mAh/g or more when lithium is inserted. Examples of metal-based active materials include lithium metal; simple substances of metals that can form a lithium alloy (for example, Ag, Al, Ba, Bi, Cu, Ga, Ge, In, Ni, P, Pb, Sb, Si, Sn, Sr, Zn, and Ti) and alloys thereof; and oxides, sulfides, nitrides, silicides, carbides, and phosphides of any of the preceding examples. Of these metal-based negative electrode active materials, active materials containing silicon (silicon-based negative electrode active materials) are preferred. One reason for this is that the capacity of a lithium ion secondary battery can be increased through use of a silicon-based negative electrode active material.

Examples of the silicon-based negative electrode active material include silicon (Si), a silicon-containing alloy, SiO, SiOx, and a composite material of conductive carbon and a Si-containing material obtained by coating or combining the Si-containing material with the conductive carbon. One of these silicon-based negative electrode active materials may be used individually, or two or more of these silicon-based negative electrode active materials may be used in combination.

The amount and particle diameter of the negative electrode active material are not specifically limited and may be the same as those of conventionally-used negative electrode active materials.

<Dispersion Medium>

The dispersion medium of the slurry composition may be a known dispersion medium such as water, N-methylpyrrolidone, or the like, without any specific limitations. In particular, water is preferable as the dispersion medium.

Note that at least a portion of the dispersion medium of the slurry composition may, without any specific limitations, be a solvent that was contained in the binder composition used to produce the slurry composition.

<Other Components>

The slurry composition may further contain other components besides the components described above. Examples of other components that can be contained in the slurry composition include conductive materials and the same components as the other components that can be contained in the previously described binder composition.

<Production Method of Slurry Composition>

The slurry composition can be produced by mixing the electrode active material, the binder composition, and the other optionally used components in the presence of the dispersion medium. Specifically, the slurry composition can be produced by mixing the components described above using a mixer such as a ball mill, a sand mill, a bead mill, a pigment disperser, a grinding machine, an ultrasonic disperser, a homogenizer, a planetary mixer, or a FILMIX.

No specific limitations are placed on the mixing ratio of the electrode active material and the binder composition in production of the slurry composition. For example, the electrode active material and the binder composition are preferably mixed such that the content of the particulate polymer in the obtained slurry composition is not less than 0.1 parts by mass and not more than 5 parts by mass per 100 parts by mass of the electrode active material.

(Electrode for Electrical Storage Device)

The presently disclosed electrode includes a current collector and an electrode mixed material layer formed on the current collector, wherein the electrode mixed material layer is formed using the slurry composition set forth above. In other words, the electrode mixed material layer contains at least the previously described electrode active material and a polymer derived from the previously described particulate polymer. It should be noted that components contained in the electrode mixed material layer are components that were contained in the slurry composition. Moreover, the preferred ratio of these components in the electrode mixed material layer is the same as the preferred ratio of these components in the slurry composition. Also note that the particulate polymer may be present in a particulate form or in another form in the electrode mixed material layer.

The presently disclosed electrode has excellent peel strength and can cause an electrical storage device to display excellent rate characteristics as a result of the electrode mixed material layer being formed using a slurry composition that contains the presently disclosed binder composition.

<Production Method of Electrode>

The presently disclosed electrode can be produced, for example, through a step of applying the previously described slurry composition onto a current collector (application step) and a step of drying the slurry composition that has been applied onto the current collector to form an electrode mixed material layer on the current collector (drying step).

<<Application Step>>

The slurry composition can be applied onto the current collector by any commonly known method without any specific limitations. Specific examples of application methods that can be used include doctor blading, dip coating, reverse roll coating, direct roll coating, gravure coating, extrusion coating, and brush coating. During application, the slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability. Specifically, the current collector may be made of, for example, iron, copper, aluminum, nickel, stainless steel, titanium, tantalum, gold, or platinum. One of these materials may be used individually, or two or more of these materials may be used in combination in a freely selected ratio.

<<Drying Step>>

The slurry composition on the current collector may be dried by a commonly known method without any specific limitations. Examples of drying methods that can be used include drying by warm, hot, or low-humidity air; drying in a vacuum; and drying by irradiation with infrared light, electron beams, or the like. Drying of the slurry composition on the current collector in this manner forms an electrode mixed material layer on the current collector and thereby provides an electrode that includes the current collector and the electrode mixed material layer. The drying temperature is preferably not lower than 60° C. and not higher than 200° C., and more preferably not lower than 90° C. and not higher than 150° C.

After the drying step, the electrode mixed material layer may be further subjected to a pressing process, such as mold pressing or roll pressing. The pressing process can further improve peel strength of the electrode.

(Electrical Storage Device)

The presently disclosed electrical storage device includes the presently disclosed electrode set forth above. For example, the presently disclosed electrical storage device may include a positive electrode, a negative electrode, an electrolyte solution, and a separator, and may have the presently disclosed electrode used as at least one of the positive electrode and the negative electrode. The presently disclosed electrical storage device has excellent rate characteristics as a result of including the presently disclosed electrode.

<Electrodes>

Examples of electrodes other than the presently disclosed electrode set forth above that can be used in the presently disclosed electrical storage device include, without any specific limitations, known electrodes that are used in production of electrical storage devices. Specifically, an electrode obtained by forming an electrode mixed material layer on a current collector by a known production method can be used as an electrode other than the presently disclosed electrode set forth above.

<Electrolyte Solution>

The electrolyte solution is normally an organic electrolyte solution obtained by dissolving a supporting electrolyte in an organic solvent. In a case in which the electrical storage device is a lithium ion secondary battery, for example, a lithium salt can be used as the supporting electrolyte. Examples of lithium salts that can be used include $LiPF_6$, LiAsF$_6$, LiBF$_4$, LiSbF$_6$, LiAlCl$_4$, LiClO$_4$, CF$_3$SO$_3$Li, C$_4$F$_9$SO$_3$Li, CF$_3$COOLi, (CF$_3$CO)$_2$NLi, (CF$_3$SO$_2$)$_2$NLi, and (C$_2$F$_5$SO$_2$)NLi. Of these lithium salts, LiPF$_6$, LiClO$_4$, and CF$_3$SO$_3$Li are preferable and LiPF$_6$ is particularly preferable as these lithium salts readily dissolve in solvents and exhibit a high degree of dissociation. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of suitable organic solvents in a case in which the electrical storage device is a lithium ion secondary battery, for example, include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region.

The concentration of the electrolyte in the electrolyte solution may be adjusted as appropriate. Furthermore, known additives may be added to the electrolyte solution.

<Separator>

Examples of separators that can be used include, but are not specifically limited to, those described in JP2012-204303A. Of these separators, a microporous membrane made of polyolefinic (polyethylene, polypropylene, polybutene, or polyvinyl chloride) resin is preferred because such a membrane can reduce the total thickness of the separator, which increases the ratio of electrode active material in the electrical storage device, and consequently increases the volumetric capacity of the electrical storage device.

<Production Method of Electrical Storage Device>

The presently disclosed electrical storage device can be produced by, for example, stacking the positive electrode and the negative electrode with the separator in-between, performing rolling, folding, or the like of the resultant laminate as necessary to place the laminate in a device container, injecting the electrolyte solution into the device container, and sealing the device container. In order to prevent pressure increase inside the electrical storage device and occurrence of overcharging or overdischarging, an overcurrent preventing device such as a fuse or a PTC device; an expanded metal; or a lead plate may be provided as necessary. The shape of the electrical storage device may be a coin type, a button type, a sheet type, a cylinder type, a prismatic type, a flat type, or the like, for example.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the examples and comparative examples, the proportion constituted by each monomer unit in a polymer is normally the same as the ratio (charging ratio) of a monomer that can form that monomer unit in a monomer composition used in polymerization of the polymer.

Note that in the examples and comparative examples, the following methods were used to evaluate the glass-transition temperature(s), number-average particle diameter, and proportion constituted by a core portion among the total of the core portion and a shell portion of a particulate polymer; the stability of a slurry composition; the peel strength of an electrode; and the rate characteristics of a lithium ion secondary battery.

<Glass-Transition Temperature>

A water dispersion containing a particulate polymer was prepared and was then dried in an environment having a humidity of 50% and a temperature of 23° C. to 25° C. for 3 days to obtain a film. The film was dried in a 120° C. hot air oven for 1 hour, and then a strip of 1.0±0.1 mm in thickness, 50±2 mm in length, and 5±0.1 mm in width was cut out from the film as a test specimen for dynamic viscoelasticity measurement. A viscoelasticity spectrometer (DMS) "EXSTAR DMS5800" (produced by Seiko Instruments Inc.) was used as a dynamic viscoelasticity measurement apparatus to measure the storage modulus, the loss modulus, and tan δ in tension deformation mode under conditions of a frequency of 1 Hz, a measurement temperature of −100° C. to 180° C., and a heating rate of 3° C./min. The temperature of a peak top for tan δ obtained in this manner was taken to be a glass-transition temperature.

The following method was used to determine whether each of two glass-transition temperatures obtained by DMS was a glass-transition temperature of a core polymer or a glass-transition temperature of a shell polymer.

First, an ultrathin section of the film obtained as described above was prepared, and the surface of the ultrathin section was measured in tapping mode using an atomic force microscope (AFM) to obtain a phase mapping image. The elastic modulus of a core portion and the elastic modulus of a shell portion were compared to determine whether each of the two glass-transition temperatures obtained by DMS was for the core portion or the shell portion. For example, in a case in which the elastic modulus of the shell portion is higher upon comparison of the elastic modulus of the core portion and the elastic modulus of the shell portion, the glass-transition temperature of the shell polymer is higher than the glass-transition temperature of the core polymer.

<Number-Average Particle Diameter>

The number-average particle diameter of a particulate polymer was measured using a transmission electron microscope. Specifically, particles (particulate polymer) were stained by a standard method using osmium tetroxide, and then the particle diameters of 100 arbitrarily selected particles were measured. An average value of the values of these particle diameters was taken to be the number-average particle diameter.

<Proportion Constituted by Core Portion Among Total of Core Portion and Shell Portion>

A particulate polymer was embedded in an embedding resin (D-800 produced by JEOL Ltd.; visible light-curable embedding resin) for a transmission electron microscope and then an ultrathin section was prepared. The ultrathin section was observed using a transmission electron microscope to measure the particle diameter of a core portion and thickness of a shell portion, and then the proportion constituted by the core portion among the total of the core portion and the shell portion was calculated with the polymer density taken to be 1 g/cm$^3$. This operation was performed for a total of 10 particles (particulate polymer), and the average value for the 10 particles was taken to be the proportion constituted by the core portion among the total of the core portion and the shell portion of the particulate polymer.

<Stability of Slurry Composition>

A planetary mixer equipped with a disper blade was charged with 25 parts of artificial graphite (specific surface area: 3.6 m²/g; volume-average particle diameter: 20 μm) and 75 parts of carbon-coated SiO as negative electrode active materials, and 2 parts in terms of solid content of a 1% aqueous solution of carboxymethyl cellulose sodium salt (CMC-Na) as a viscosity modifier. The mixture of these materials was adjusted to a solid content concentration of 60% with deionized water and was then mixed at 25° C. for 60 minutes. Next, the mixture was adjusted to a solid content concentration of 52% with deionized water and was then further mixed at 25° C. for 15 minutes to obtain a mixed liquid. The viscosity M0 (mPa·s) of the mixed liquid was measured using a B-type viscometer (produced by Toki Sangyo Co., Ltd.; product name: TV-25) under measurement conditions of a measurement temperature of 25° C., a No. 4 measurement rotor, and a rotor speed of 60 rpm.

On the other hand, 2.0 parts in terms of solid content of a binder composition having the same chemical composition as a binder composition produced in each example or comparative example was added to a mixed liquid having the same chemical composition as the mixed liquid for which the viscosity M0 was measured. A solution for measurement of viscosity M1 that was obtained in this manner was then loaded in a vessel having a diameter of 5.5 cm and a height of 8.0 cm and was stirred at a rotation speed of 3,000 rpm for 10 minutes using a TK Homogenizing Disper (produced by PRIMIX Corporation; disper blade diameter: 40 mm). The viscosity M1 (mPa·s) of the slurry composition after stirring was measured in the same manner as M0. Slurry composition stability was calculated as $\Delta M = M1/M0$ (times), and slurry stability was evaluated in accordance with the following standard. A smaller value indicates higher slurry composition stability.

A: $\Delta M$ of 1.0 times or less
B: $\Delta M$ of more than 1.0 times and less than 1.2 times
C: $\Delta M$ of 1.2 times or more <Peel Strength>

A rectangle of 1.0 cm in width by 10 cm in length was cut out from a produced negative electrode for a lithium ion secondary battery as a test specimen and was fixed with the surface at the negative electrode mixed material layer side facing upward. Cellophane tape was affixed to the surface at the negative electrode mixed material layer side of the test specimen. Tape prescribed by JIS Z1522 was used as the cellophane tape. Thereafter, the stress was measured when the cellophane tape was peeled off from one end of the test specimen in a direction at 180° (toward the other end of the test specimen) and at a speed of 50 mm/min. This measurement was performed 10 times to obtain an average value of the stress. The average value was taken to be the peel strength (N/m) and was evaluated by the following standard. A larger peel strength indicates better close adherence of the negative electrode mixed material layer to the current collector.

A: 10 N/m or more
B: Not less than 8 N/m and less than 10 N/m
C: Less than 8 N/m <Rate Characteristics>

A produced lithium ion secondary battery was left at rest in a 25° C. environment for 24 hours, was subsequently charged to a cell voltage of 3.65 V by a 0.2 C constant-current method in a 25° C. environment, was then subjected to 12 hours of aging at a temperature of 60° C., and was subsequently discharged to a cell voltage of 3.00 V by a 0.2 C constant-current method. Next, the lithium ion secondary battery was subjected to CC-CV charging (upper limit cell voltage: 4.2 V) by a 0.1 C constant-current method and CC discharging to a cell voltage of 3.00 V by a 0.1 C constant-current method in a 60° C. environment. This charging and discharging at 0.1 C was repeated three times.

Thereafter, the lithium ion secondary battery was subjected to a charge/discharge cycle of charging to 4.2 V with a charge rate of 0.2 C and discharging to 3.0 V with a discharge rate of 1.0 C and a charge/discharge cycle of charging to 4.2 V with a charge rate of 0.2 C and discharging to 3.0V with a discharge rate of 3.0 C at 25° C. The battery capacity at 3.0 C was calculated as a percentage relative to the battery capacity at 1.0 C. The calculated percentage was taken to be a charge/discharge rate characteristic and was evaluated by the following standard. A higher value for the charge/discharge rate characteristic indicates lower internal resistance and capability for high-speed charging and discharging, and thus indicates better rate characteristics.

A: Charge/discharge rate characteristic of 70% or more
B: Charge/discharge rate characteristic of not less than 65% and less than 70%
C: Charge/discharge rate characteristic of not less than 60% and less than 65%
D: Charge/discharge rate characteristic of less than 60%

Example 1

<Production of Binder Composition for Lithium Ion Secondary Battery Negative Electrode>

A 5 MPa pressure-resistant vessel equipped with a stirrer was charged with 3.8 parts of styrene, 0.2 parts of methacrylic acid, 100 parts of deionized water, 0.7 parts of dodecylbenzenesulfonic acid as an emulsifier, 0.1 parts of α-methylstyrene dimer as a chain transfer agent, and 0.3 parts of potassium persulfate as a polymerization initiator for core portion formation. These materials were sufficiently stirred and were then heated to 60° C. to initiate polymerization that was continued until the polymerization conversion rate reached 98% to obtain seed particles. Next, 16 parts of acrylonitrile as a cyano group-containing monomer, 30 parts of 1,3-butadiene as an aliphatic conjugated diene monomer, 0.3 parts of sodium dodecylbenzenesulfonate as an emulsifier, 50 parts of deionized water, and 0.4 parts of potassium persulfate as a polymerization initiator were added into the same pressure-resistant vessel under stirring. Heating was performed to 60° C., and polymerization was continued until the polymerization conversion rate reached 80% to obtain a water dispersion containing a particulate polymer forming a core portion.

The water dispersion was heated to 70° C., 6 parts of acrylonitrile as a cyano group-containing monomer, 1 part of acrylamide as an amide group-containing monomer, 11 parts of 1,3-butadiene as an aliphatic conjugated diene monomer, 21 parts of styrene as an aromatic vinyl monomer, 8 parts of methyl methacrylate as a (meth)acrylic acid ester monomer, 1.5 parts of acrylic acid and 1.5 parts of itaconic acid as acidic group-containing monomers, 30 parts of deionized water, and 0.4 parts of t-dodecyl mercaptan as a chain transfer agent were continuously added to the water dispersion for shell portion formation, and polymerization was continued. Cooling was performed to quench the reaction at the point at which the polymerization conversion rate reached 96% to obtain a water dispersion containing a particulate polymer having a core-shell structure in which a shell portion completely covered the outer surface of a core portion. The obtained water dispersion containing the particulate polymer was adjusted to pH 8 through addition of 5% sodium hydroxide aqueous solution. In addition, 1.0 parts of sodium polyacrylate having a weight-average molecular weight of 6,000 was added, and then unreacted monomer was removed by thermal-vacuum distillation. Cooling was subsequently performed to 30° C. to obtain a binder composition for a lithium ion secondary battery negative electrode. The binder composition was used to evaluate slurry composition stability. The result is shown in Table 1.

Measurement results for the number-average particle diameter and glass-transition temperatures of the obtained particulate polymer are also shown in Table 1.

<Production of Slurry Composition for Lithium Ion Secondary Battery Negative Electrode>

A planetary mixer equipped with a disper blade was charged with 25 parts of artificial graphite (specific surface area: 3.6 m$^2$/g; volume-average particle diameter: 20 μm) and 75 parts of carbon-coated SiO as negative electrode active materials, and 2 parts in terms of solid content of a 1% aqueous solution of carboxymethyl cellulose sodium salt (CMC-Na) as a viscosity modifier. The mixture of these materials was adjusted to a solid content concentration of 60% with deionized water and was then mixed at 25° C. for 60 minutes.

Next, the mixture was adjusted to a solid content concentration of 52% with deionized water and was then further mixed at 25° C. for 15 minutes to obtain a mixed liquid.

Deionized water and 1 part in terms of solid content of the water dispersion of the particulate polymer (binder composition for a lithium ion secondary battery negative electrode) were then added to the mixed liquid, the final solid content concentration was adjusted to 50%, and a further 10 minutes of mixing was performed. The resultant mixed liquid was subjected to a defoaming process under reduced pressure to obtain a slurry composition for a lithium ion secondary battery negative electrode.

<Production of Negative Electrode for Lithium Ion Secondary Battery>

The produced slurry composition for a negative electrode was applied onto copper foil (current collector) of 15 μm in thickness by a comma coater such as to have a coating weight of 12.0 mg/cm$^2$. The slurry composition was dried by conveying the copper foil inside a 70° C. oven for 2 minutes at a speed of 0.5 m/min. Thereafter, 2 minutes of heat treatment was performed at 120° C. to obtain a negative electrode web.

The obtained negative electrode web was pressed by a roll press to obtain a negative electrode for a lithium ion secondary battery (negative electrode mixed material layer density: 1.60 g/cm$^3$; negative electrode mixed material layer thickness: 75 μm).

The peel strength of the produced negative electrode was evaluated. The result is shown in Table 1.

<Production of Positive Electrode for Lithium Ion Secondary Battery>

A slurry composition for a lithium ion secondary battery positive electrode was obtained by loading 100 parts of LiCoO$_2$ as a positive electrode active material, 2 parts of acetylene black (HS-100 produced by Denka Company Limited) as a conductive additive, and 2 parts of PVDF (polyvinylidene fluoride; KF-1100 produced by Kureha Corporation) as a binder into a planetary mixer, adding N-methylpyrrolidone to adjust the total solid content concentration to 67%, and mixing these materials.

The obtained slurry composition was applied onto aluminum foil (current collector) of 20 μm in thickness by a comma coater. The slurry composition was dried by conveying the aluminum foil inside a 60° C. oven for 2 minutes at a speed of 0.5 m/min.

Thereafter, 2 minutes of heat treatment was performed at 120° C. to obtain a positive electrode web.

The obtained positive electrode web was pressed by a roll press to obtain a positive electrode for a lithium ion secondary battery (positive electrode mixed material layer density: 3.10 g/cm$^3$ to 3.20 g/cm$^3$).

<Production of Lithium Ion Secondary Battery>

A separator made from a single layer of polypropylene (width: 65 mm; length: 500 mm; thickness: 25 μm; produced by dry method; porosity: 55%) was prepared and was cut out as a 5 cm×5 cm square. In addition, an aluminum packing case was prepared as a battery case.

The produced positive electrode was cut out as a 4 cm×4 cm square and was arranged with the surface at the current collector side thereof in contact with the aluminum packing case. Next, the square separator was arranged on the surface at the positive electrode mixed material layer side of the positive electrode. In addition, the produced negative electrode was cut out as a 4.2 cm×4.2 cm square and was arranged on the separator such that the surface at the negative electrode mixed material layer side thereof faced the separator. Thereafter, LiPF$_6$ solution of 1.0 M in concentration (solvent:mixed solvent of ethylene carbonate/ethyl methyl carbonate=3/7 (volume ratio); additive: 2 mass % (solvent ratio) of vinylene carbonate) was loaded as an electrolyte solution. The aluminum packing case was then closed by heat sealing at 150° C. to tightly seal an opening of the aluminum packing case, and thereby produce a lithium ion secondary battery.

Rate characteristics of the produced lithium ion secondary battery were evaluated. The result is shown in Table 1.

Examples 2 and 4

A binder composition for a lithium ion secondary battery negative electrode (water dispersion of a particulate polymer), a slurry composition for a lithium ion secondary battery negative electrode, a negative electrode for a lithium ion secondary battery, a positive electrode for a lithium ion secondary battery, and a lithium ion secondary battery were produced in the same way as in Example 1 with the exception that the types and proportions of monomers used for shell portion formation and core portion formation in production of the particulate polymer were changed as shown in Table 1. Note that each of the obtained particulate polymers had a core-shell structure in which a shell portion completely covered the outer surface of a core portion. The various evaluations were also carried out. The results are shown in Table 1.

Examples 3, 5, and 6

A binder composition for a lithium ion secondary battery negative electrode (water dispersion of a particulate polymer), a slurry composition for a lithium ion secondary battery negative electrode, a negative electrode for a lithium ion secondary battery, a positive electrode for a lithium ion secondary battery, and a lithium ion secondary battery were produced in the same way as in Example 1 with the exception that in production of the particulate polymer, the chemical composition of the seed particles was changed to 3.8 parts of styrene, 1 part of 1,3-butadiene, and 0.2 parts of methacrylic acid, and the types and proportions of monomers used for shell portion formation and core portion formation were changed as shown in Table 1. Each of the obtained particulate polymers had a core-shell structure in which a shell portion completely covered the outer surface of a core portion. The various evaluations were also carried out. The results are shown in Table 1.

Example 7

A slurry composition for a lithium ion secondary battery negative electrode, a negative electrode for a lithium ion secondary battery, a positive electrode for a lithium ion secondary battery, and a lithium ion secondary battery were produced in the same way as in Example 1 with the exception that a binder composition for a lithium ion secondary battery negative electrode (water dispersion of a particulate polymer) obtained as described below was used. The various evaluations were also carried out. The results are shown in Table 1.
<Production of Binder Composition for Lithium Ion Secondary Battery Negative Electrode>

A 5 MPa pressure-resistant vessel equipped with a stirrer was charged with 12 parts of acrylonitrile as a cyano group-containing monomer, 27 parts of 1,3-butadiene as an aliphatic conjugated diene monomer, 1.0 parts of acrylamide as an amide group-containing monomer, 1.0 parts of sodium dodecylbenzenesulfonate as an emulsifier, 0.1 parts of α-methylstyrene dimer as a chain transfer agent, 150 parts of deionized water, and 0.7 parts of potassium persulfate as a polymerization initiator. These materials were sufficiently stirred and were then heated to 60° C. to initiate polymerization that was continued until the polymerization conversion rate reached 80% to obtain a water dispersion containing a particulate polymer forming a core portion.

The water dispersion was heated to 70° C., 2.0 parts of acrylamide as an amide group-containing monomer, 11 parts of 1,3-butadiene as an aliphatic conjugated diene monomer, 43 parts of styrene as an aromatic vinyl monomer, 2.0 parts of acrylic acid and 2.0 parts of itaconic acid as acidic group-containing monomers, 30 parts of deionized water, and 0.4 parts of t-dodecyl mercaptan as a chain transfer agent were continuously added to the water dispersion for shell portion formation, and polymerization was continued. Cooling was performed to quench the reaction at the point at which the polymerization conversion rate reached 96% to obtain a water dispersion containing a particulate polymer having a core-shell structure in which a shell portion completely covered the outer surface of a core portion. The obtained water dispersion containing the particulate polymer was adjusted to pH 8 through addition of 5% sodium hydroxide aqueous solution. Unreacted monomer was subsequently removed by thermal-vacuum distillation. Thereafter, cooling was performed to 30° C. to obtain a binder composition for a lithium ion secondary battery negative electrode.

Comparative Examples 1 and 3

A binder composition for a lithium ion secondary battery negative electrode (water dispersion of a particulate polymer), a slurry composition for a lithium ion secondary battery negative electrode, a negative electrode for a lithium ion secondary battery, a positive electrode for a lithium ion secondary battery, and a lithium ion secondary battery were produced in the same way as in Example 1 with the exception that the types and proportions of monomers used for shell portion formation and core portion formation in production of the particulate polymer were changed as shown in Table 1. Note that each of the obtained particulate polymers had a core-shell structure in which a shell portion completely covered the outer surface of a core portion. The various evaluations were also carried out. The results are shown in Table 1.

Comparative Example 2

A slurry composition for a lithium ion secondary battery negative electrode, a negative electrode for a lithium ion secondary battery, a positive electrode for a lithium ion secondary battery, and a lithium ion secondary battery were produced in the same way as in Example 1 with the exception that a binder composition for a lithium ion secondary battery negative electrode (water dispersion of a particulate polymer) obtained as described below was used. The various evaluations were also carried out. The results are shown in Table 1.
<Production of Binder Composition for Lithium Ion Secondary Battery Negative Electrode>

A 5 MPa pressure-resistant vessel equipped with a stirrer was charged with 3.8 parts of styrene, 0.2 parts of methacrylic acid, 100 parts of deionized water, 0.7 parts of dodecylbenzenesulfonic acid as an emulsifier, and 0.3 parts of potassium persulfate as a polymerization initiator. These materials were sufficiently stirred and were then heated to 60° C. to initiate polymerization that was continued until the polymerization conversion rate reached 98% to obtain seed particles. Next, the reactor was heated to 80° C., a monomer mixture containing 22 parts of acrylonitrile as a cyano group-containing monomer, 41 parts of 1,3-butadiene as an aliphatic conjugated diene monomer, 21 parts of styrene as an aromatic vinyl monomer, 8 parts of methyl methacrylate as a (meth)acrylic acid ester monomer, 1.5 parts of acrylic acid and 1.5 parts of itaconic acid as acidic group-containing monomers, 1 part of acrylamide as an amide group-containing monomer, 0.5 parts of t-dodecyl mercaptan as a chain transfer agent, 0.3 parts of α-methylstyrene dimer, and 50 parts of deionized water, and a polymerization initiator aqueous solution containing 1 part of potassium persulfate as a polymerization initiator and 20 parts of deionized water were continuously added into the reactor over 7 hours under stirring, polymerization was continued until the polymerization conversion rate reached 98%, and then the reaction was quenched by cooling. The resultant water dispersion containing a particulate polymer (non-core-shell structure) was adjusted to pH 8 through addition of 5% sodium hydroxide aqueous solution, 1.0 parts of sodium polyacrylate having a weight-average molecular weight of 6,000 was further added thereto, and unreacted monomer was subsequently removed by thermal-vacuum distillation. Thereafter, cooling was performed to 30° C.

In Table 1, shown below:
"AN" indicates acrylonitrile unit;
"AAm" indicates acrylamide unit;
"BD" indicates 1,3-butadiene unit;
"ST" indicates styrene unit;
"MMA" indicates methyl methacrylate unit;
"AA" indicates acrylic acid unit;
"IA" indicates itaconic acid unit;
"MAA" indicates methacrylic acid unit;
"2HEA" indicates 2-hydroxyethyl acrylate unit; and
"Core portion/(Core portion+Shell portion)" indicates proportion constituted by core portion among total of core portion and shell portion.

TABLE 1

| | | | | | Example 1 | Example 2 | Example 3 | Example 4 | Example 5 | Example 6 |
|---|---|---|---|---|---|---|---|---|---|---|
| | | Structure | | | Core-shell | Core-shell | Core-shell | Core-shell | Core-shell | Core-shell |
| Particulate polymer | Chemical composition | Core portion [mass %] | Seed particles | ST | 3.8 | 3.8 | 3.8 | 3.8 | 3.8 | 3.8 |
| | | | | MAA | 0.2 | 0.2 | 0.2 | 0.2 | 0.2 | 0.2 |
| | | | | BD | 0 | 0 | 1 | 0 | 1 | 1 |
| | | | Cyano group-containing monomer unit | AN | 16 | 20 | 10 | 7 | 10 | 24 |
| | | | Amide group-containing monomer unit | AAm | 0 | 0 | 0 | 0 | 0 | 0 |
| | | | Other monomer units | BD | 30 | 36 | 25 | 29 | 25 | 39 |
| | | | | MMA | 0 | 0 | 0 | 0 | 0 | 0 |
| | | | | 2HEA | 0 | 0 | 0 | 0 | 0 | 0 |
| | | | | IA | 0 | 0 | 0 | 0 | 0 | 0 |
| | | Shell portion [mass %] | Cyano group-containing monomer unit | AN | 6 | 7 | 6 | 6 | 6 | 5 |
| | | | Amide group-containing monomer unit | AAm | 1 | 1.6 | 2 | 2 | 4 | 1.6 |
| | | | Other monomer units | BD | 11 | 8 | 17 | 17 | 16 | 6 |
| | | | | ST | 21 | 12.5 | 23.7 | 23.7 | 22.7 | 10.5 |
| | | | | MMA | 8 | 8 | 8 | 8 | 8 | 6 |
| | | | | AA | 1.5 | 1.4 | 1.5 | 1.5 | 1.5 | 1.4 |
| | | | | IA | 1.5 | 1.5 | 1.8 | 1.8 | 1.8 | 1.5 |
| | | Overall [mass %] | Cyano group-containing monomer unit | | 22 | 27 | 16 | 13 | 16 | 29 |
| | | | Amide group-containing monomer unit | | 1 | 1.6 | 2 | 2 | 4 | 1.6 |
| | | | Other monomer units | | 77 | 71.4 | 82 | 85 | 80 | 69.4 |
| | | Core portion/(Core portion + Shell portion) [mass %] | | | 50 | 60 | 40 | 40 | 40 | 68 |
| | Glass-transition temperature | Number of glass-transition temperatures | | | 2 | 2 | 2 | 2 | 2 | 2 |
| | | Core-shell [° C.] | Core polymer | | −30 | −34 | −37 | −48 | −38 | −28 |
| | | | Shell polymer | | 41 | 48 | 26 | 26 | 31 | 52 |
| | | Non-core-shell [° C.] | | | — | — | — | — | — | — |
| | Number-average particle diameter [nm] | | | | 98 | 95 | 93 | 99 | 94 | 95 |
| | Peel strength | | | | A | A | A | A | B | B |
| | Slurry composition stability | | | | A | A | A | A | B | A |
| | Rate characteristics | | | | A | A | A | B | A | A |

| | | | | | Example 7 | Comparative Example 1 | Comparative Example 2 | Comparative Example 3 |
|---|---|---|---|---|---|---|---|---|
| | | Structure | | | Core-shell | Core-shell | Non-core-shell | Core-shell |
| Particulate polymer | Chemical composition | Core portion [mass %] | Seed particles | ST | — | 3.8 | 3.8 | 3.8 |
| | | | | MAA | — | 0.2 | 0.2 | 0.2 |
| | | | | BD | — | 0 | 0 | 0 |
| | | | Cyano group-containing monomer unit | AN | 12 | 16 | — | 0 |
| | | | Amide group-containing monomer unit | AAm | 1 | 0 | — | 0 |
| | | | Other monomer units | BD | 27 | 30 | — | 10 |
| | | | | MMA | 0 | 0 | — | 18 |
| | | | | 2HEA | 0 | 0 | — | 1.5 |
| | | | | IA | 0 | 0 | — | 0.5 |
| | | Shell portion [mass %] | Cyano group-containing monomer unit | AN | 0 | 6 | — | 20 |
| | | | Amide group-containing monomer unit | AAm | 2 | 0 | — | 2 |
| | | | Other monomer units | BD | 11 | 11 | — | 20 |
| | | | | ST | 43 | 22 | — | 21 |
| | | | | MMA | 0 | 8 | — | 0 |
| | | | | AA | 2 | 1.5 | — | 0 |
| | | | | IA | 2 | 1.5 | — | 3 |
| | | Overall [mass %] | Cyano group-containing monomer unit | | 12 | 22 | 22 | 20 |

TABLE 1-continued

|  |  | | | | |
|---|---|---|---|---|---|
|  | Amide group-containing monomer unit | 3 | 0 | 1 | 2 |
|  | Other monomer units | 85 | 78 | 77 | 78 |
|  | Core portion/(Core portion + Shell portion) [mass %] | 40 | 50 | — | 34 |
| Glass-transition temperature [° C.] | Number of glass-transition temperatures | 2 | 2 | 1 | 2 |
| | Core-shell Core polymer | −40 | −29 | — | 16 |
| | Core-shell Shell polymer | 51 | 40 | — | 26 |
| | Non-core-shell [° C.] | — | — | 3 | — |
|  | Number-average particle diameter [nm] | 104 | 96 | 91 | 97 |
|  | Peel strength | B | B | B | C |
|  | Slurry composition stability | A | C | B | B |
|  | Rate characteristics | B | B | C | D |

It can be seen from Table 1 that it was possible to enhance slurry composition stability, electrode peel strength, and lithium ion secondary battery rate characteristics in a good balance in Examples 1 to 7 in which the used binder composition contained a particulate polymer that included a cyano group-containing monomer unit and an amide group-containing monomer unit in specific proportions, that had at least one glass-transition temperature at not higher than a specific temperature, and that had a core-shell structure.

On the other hand, slurry composition stability decreased in Comparative Example 1 in which the used binder composition contained a particulate polymer in which the proportional content of an amide group-containing monomer unit was less than a specific value.

Moreover, lithium ion secondary battery rate characteristics deteriorated in Comparative Example 2 in which the used binder composition contained a particulate polymer that did not have a core-shell structure.

Furthermore, electrode peel strength decreased and lithium ion secondary battery rate characteristics deteriorated in Comparative Example 3 in which the used binder composition contained a particulate polymer that did not have a glass-transition temperature at not higher than a specific temperature.

INDUSTRIAL APPLICABILITY

According to the present disclosure, it is possible to provide a binder composition for an electrical storage device that can both ensure stability of a slurry composition and enhance peel strength of an electrode and rate characteristics of an electrical storage device.

Moreover, according to the present disclosure, it is possible to provide a slurry composition for an electrical storage device electrode that has excellent stability and can enhance peel strength of an electrode and rate characteristics of an electrical storage device.

Furthermore, according to the present disclosure, it is possible to provide an electrode for an electrical storage device that has excellent peel strength and can cause an electrical storage device to display excellent rate characteristics.

Also, according to the present disclosure, it is possible to provide an electrical storage device having excellent rate characteristics.

REFERENCE SIGNS LIST

100 particulate polymer
110 core portion
110S outer surface of core portion
120 shell portion

The invention claimed is:

1. A binder composition for an electrical storage device comprising a particulate polymer, wherein
    the particulate polymer includes a cyano group-containing monomer unit in a proportion of not less than 5 mass % and not more than 45 mass % and includes an amide group-containing monomer unit in a proportion of not less than 0.3 mass % and not more than 10 mass % when all monomer units included in the particulate polymer are taken to be 100 mass %,
    the particulate polymer has a core-shell structure including a core portion and a shell portion at least partially covering an outer surface of the core portion, and the particulate polymer has at least one glass-transition temperature at 10° C. or lower,
    a polymer of the core portion includes the cyano group-containing monomer unit,
    a polymer of the shell portion includes the cyano group-containing monomer unit,
    the particulate polymer includes the cyano group-containing monomer unit in the core portion in a larger amount than in the shell portion, and
    a glass-transition temperature of the polymer of the shell portion is higher than a glass-transition temperature of the polymer of the core portion.

2. The binder composition for an electrical storage device according to claim 1, wherein the particulate polymer has at least two glass-transition temperatures within a range of −80° C. to 80° C.

3. The binder composition for an electrical storage device according to claim 1, wherein the core portion constitutes a proportion of not less than 30 mass % and not more than 70 mass % among a total of the core portion and the shell portion.

4. A slurry composition for an electrical storage device electrode comprising: an electrode active material; and the binder composition for an electrical storage device according to claim 1.

5. An electrode for an electrical storage device comprising: an electrode mixed material layer formed using the slurry composition for an electrical storage device electrode according to claim 4; and a current collector.

6. An electrical storage device comprising the electrode for an electrical storage device according to claim 5.

7. The binder composition for an electrical storage device according to claim 1, wherein the proportion in which the polymer of the shell includes the cyano group-containing monomer unit when all monomer units included in the particulate polymer are taken to be 100 mass % is 1 mass % or more and 10 mass % or less.

8. The binder composition for an electrical storage device according to claim 1, wherein the proportion in which the polymer of the shell includes the cyano group-containing monomer unit when all monomer units included in the particulate polymer are taken to be 100 mass % is 5 mass % or more and 10 mass % or less.

* * * * *